(12) United States Patent
Tsai et al.

(10) Patent No.: US 10,496,189 B2
(45) Date of Patent: Dec. 3, 2019

(54) MOUSE WITH INERITA SCROLL WHEEL MODULE

(71) Applicant: Primax Electronics Ltd., Taipei (TW)

(72) Inventors: Yung-Ming Tsai, Taipei (TW); Chia-Yuan Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 5 days.

(21) Appl. No.: 15/865,728

(22) Filed: Jan. 9, 2018

(65) Prior Publication Data

US 2019/0094994 A1    Mar. 28, 2019

(30) Foreign Application Priority Data

Sep. 28, 2017  (TW) .............................. 106133430 A

(51) Int. Cl.
*G06F 3/0354*    (2013.01)
*G06F 3/0362*    (2013.01)

(52) U.S. Cl.
CPC ........ *G06F 3/03543* (2013.01); *G06F 3/0362* (2013.01)

(58) Field of Classification Search
CPC ........................... G06F 3/03543; G06F 3/0362
See application file for complete search history.

(56) References Cited

U.S. PATENT DOCUMENTS

| 6,100,874 A | * | 8/2000 | Schena | ................... G01B 5/008 |
| | | | | 345/157 |
| 2009/0189852 A1 | * | 7/2009 | Chou | .................... G06F 3/0362 |
| | | | | 345/156 |
| 2017/0299412 A1 | * | 10/2017 | Tseng | .................... G06F 3/0362 |

* cited by examiner

*Primary Examiner* — Dennis P Joseph
(74) *Attorney, Agent, or Firm* — Muncy, Geissler, Olds & Lowe, P.C.

(57) ABSTRACT

The present invention provides a mouse with an inertia scroll wheel module, including a mouse body and an inertia scroll wheel module, where the inertia scroll wheel module is mounted in the mouse body; the inertia scroll wheel module includes a support frame, a scroll wheel, and an encoding element; the support frame is fixed in the mouse body; the scroll wheel is pivotally connected to the support frame; the scroll wheel is an element made of a glass material; and the encoding element is connected to the scroll wheel. In this way, rotational inertia of the scroll wheel is increased.

8 Claims, 5 Drawing Sheets

MOUSE WITH INERITA SCROLL WHEEL MODULE

FIELD OF THE INVENTION

The present invention relates to a mouse with an inertia scroll wheel module.

BACKGROUND OF THE INVENTION

In a computer device or an electronic game device, a mouse is usually used to operate an electronic file, application software, or a virtual game on a display screen, and usually a scroll wheel of the mouse is scrolled to drag content on the display screen.

A conventional mouse mainly includes a mouse body and a scroll wheel module. The scroll wheel module is mounted in the mouse body, and has a support frame, a scroll wheel, a connection shaft, and an encoder. The scroll wheel is placed in the support frame. The connection shaft passes through and is connected to the scroll wheel, and two ends of the connection shaft are respectively connected to two sides of the support frame. The encoder is connected to the scroll wheel. When a user scrolls the scroll wheel, the encoder may be rotated by using the scroll wheel, so as to drag content on a display screen.

Because the scroll wheel of the conventional mouse is usually an element made of a plastic material, the scroll wheel is relatively light. Therefore, rotational inertia of the scroll wheel of the conventional mouse is relatively insufficient. As a result, when the user operates an electronic file, application software, or a virtual game on the display screen, if the user needs to drag to display a page on the display screen by continually scrolling the scroll wheel, the user's finger needs to continually scroll the scroll wheel to complete this operation. Therefore, the conventional mouse is inconvenient to use, and needs to be improved.

SUMMARY OF THE INVENTION

A main objective of the present invention is to provide a mouse with an inertia scroll wheel module.

In a preferred embodiment, the present invention provides a mouse with an inertia scroll wheel module, including a mouse body and an inertia scroll wheel module, where the inertia scroll wheel module is mounted in the mouse body; the inertia scroll wheel module includes a support frame, a scroll wheel, and an encoding element; the support frame is fixed in the mouse body; the scroll wheel is placed in the support frame and is pivotally connected to the support frame; the scroll wheel is a non-metallic element; and the encoding element is located at one side of the transparent inertia scroll wheel and is connected to the scroll wheel. In this way, weight of the scroll wheel is increased, so as to increase rotational inertia of the scroll wheel, thereby prolonging scrolling time of the scroll wheel.

Preferably, the inertia scroll wheel module includes a connection shaft; the support frame has a first support member and a second support member whose bottom portions are separately fixed at the mouse body; a placement space is formed between the first support member and the second support member; the scroll wheel is placed in the placement space; the connection shaft passes through and is connected to the scroll wheel; one end of the connection shaft is pivotally connected to the first support member, and the other end is pivotally connected to the second support member; and the scroll wheel is pivotally connected to the support frame by using the connection shaft. Preferably, the inertia scroll wheel module further has an antiskid outer ring member; the antiskid outer ring member is sleeved on an outer portion of the scroll wheel; and the antiskid outer ring member and the scroll wheel are concentrically configured. Preferably, the antiskid outer ring member is an element made of a transparent or semi-transparent material. In this way, the mouse is convenient to use and has an improved optical effect.

Preferably, the connection shaft has a first connection section and a second connection section protruding from the first connection section; the first connection section is pivotally connected to the first support member; the second connection section is pivotally connected to the second support member and is connected to the encoding element; and the encoding element is connected to the scroll wheel by using the second connection section. Preferably, the inertia scroll wheel module further includes a middle button sensing element; a crimping portion protrudes from one end that is of the first connection section and that is far away from the scroll wheel; and the crimping portion is capable of being crimped to the middle button sensing element. Preferably, the encoding element and the middle button sensing element are separately electrically connected to the mouse body; the encoding element is an encoder; and the middle button sensing element is a button sensor. Preferably, the first connection section has a hollow channel; the first connection section and the second connection section are stepped; and the diameter of the first connection section is greater than the diameter of the second connection section. Preferably, central shafts of the first connection section, the second connection section, the scroll wheel, and the antiskid outer ring member are a same central shaft. Preferably, the first support member is located between the middle button sensing element and the scroll wheel; and the second support member is located between the scroll wheel and the encoding element. In this way, decentering during scrolling of the scroll wheel can be avoided, so as to prolong the service life of the inertia scroll wheel module.

Preferably, one side that is of the scroll wheel and that is adjacent to the second support member is provided with a mounting groove; the scroll wheel module further includes an inner ratchet wheel, a compression bar, and an elastic element; the connection shaft runs through the mounting groove; the inner ratchet wheel is mounted in the mounting groove; one side of the compression bar is pivotally connected to the mouse body, and the other side is engaged with the inner ratchet wheel; and one side of the elastic element is connected to the second support member, and the other side is connected to the compression bar. Preferably, the inner ratchet wheel is an element made of a soft material such as rubber, polyurethane, or silicon. In this way, scrolling noise of the scroll wheel is reduced.

Preferably, the encoding element includes a rotation disk and a signal receiving unit; the rotation disk is mounted at a side surface that is of the scroll wheel and that is far away from the mounting groove; the connection shaft is connected to the scroll wheel by penetrating the rotation disk; and the signal receiving unit is electrically connected to the mouse body and is disposed to correspond to the rotation disk. Preferably, central shafts of the rotation disk, the mounting groove, the connection shaft, the antiskid outer ring member, and the scroll wheel are a same central shaft. In this way, decentering during scrolling of the scroll wheel can be avoided, so as to prolong the service life of the inertia scroll wheel module.

Preferably, the non-metallic element that forms the scroll wheel is an element made of a glass material. Preferably, the non-metallic element that forms the scroll wheel is an element made of a ceramic material.

DETAILED DESCRIPTION OF THE PREFERRED EMBODIMENT

Figure 1:
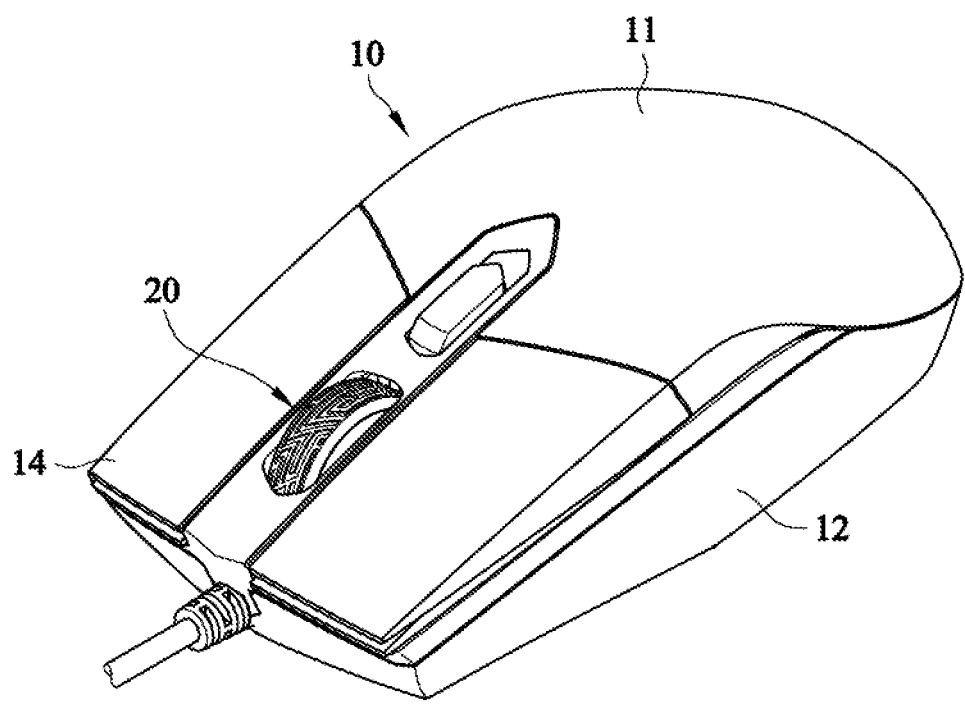
FIG. 1 is a three-dimensional view of a mouse with an inertia scroll wheel module according to the present invention.
Figure 2:
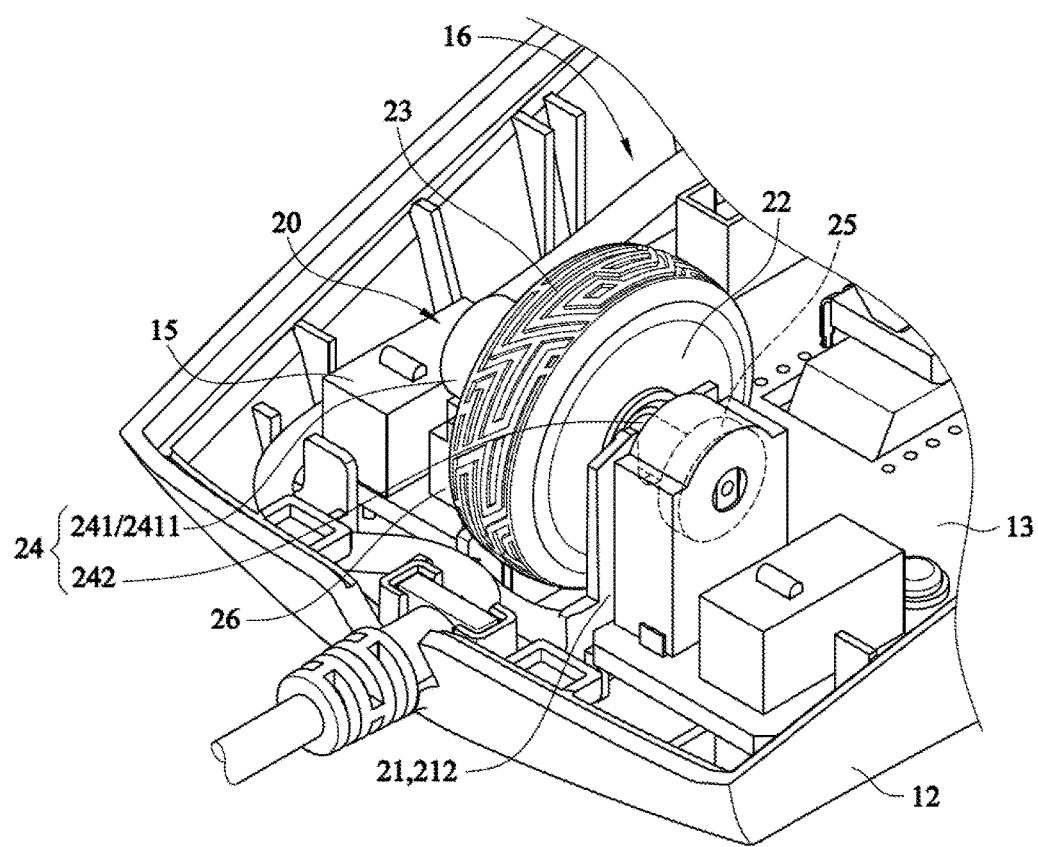
FIG. 2 is a schematic diagram of a mouse with an inertia scroll wheel module according to the present invention.
Figure 3:
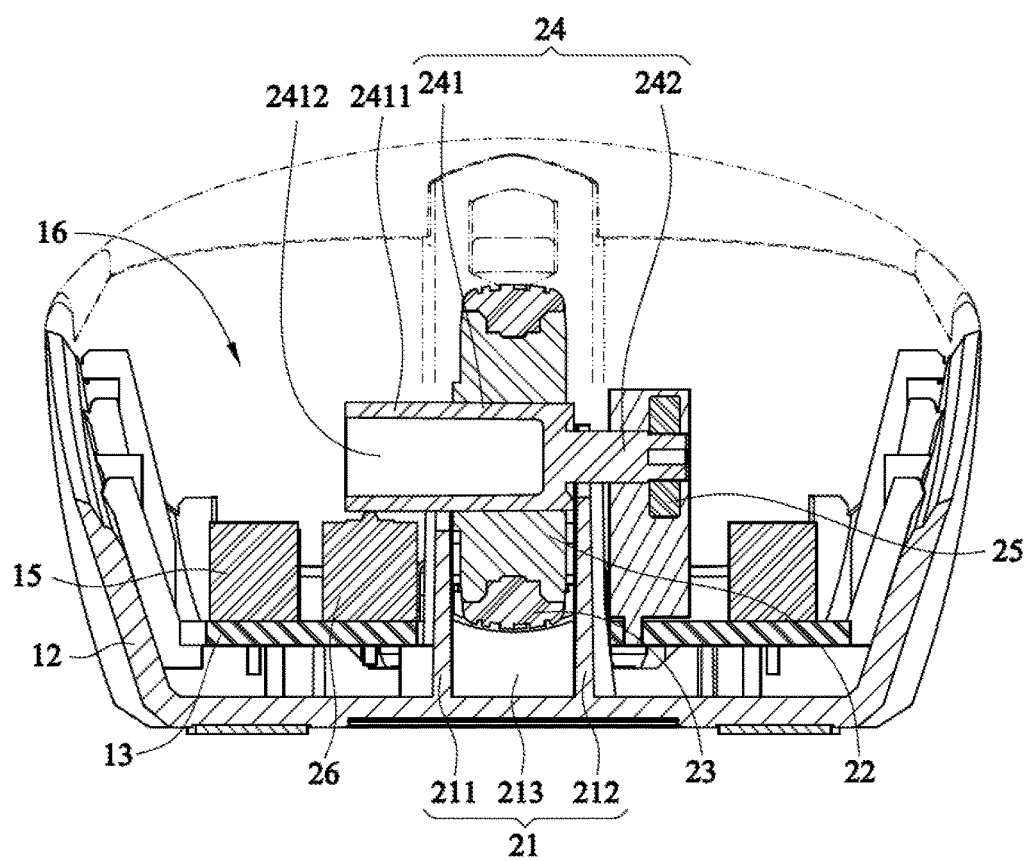
FIG. 3 is a sectional view of a mouse with an inertia scroll wheel module according to the present invention.

Referring to FIG. 1 to FIG. 3, FIG. 1 is a three-dimensional view of a mouse with an inertia scroll wheel module according to the present invention; FIG. 2 is a schematic diagram of a mouse with an inertia scroll wheel module according to the present invention; and FIG. 3 is a sectional view of a mouse with an inertia scroll wheel module according to the present invention. A mouse 100 with an inertia scroll wheel module includes a mouse body 10 and an inertia scroll wheel module 20.

The mouse body 10 has an upper housing 11, a lower housing 12, a circuit board 13, a pair of buttons 14, and a pair of button sensing elements 15. The upper housing 11 corresponds to a cover of the lower housing 12, and an accommodation space 16 is formed between the upper housing 11 and the lower housing 12. The circuit board 13 is mounted in the accommodation space 16 and is fixed on the lower housing 12. The pair of buttons 14 is respectively disposed on the upper housing 11. The pair of button sensing elements 15 is respectively disposed in the accommodation space 16, and is respectively fixed at and electrically connected to the circuit board 13. The buttons 14 are respectively connected to the button sensing elements 15, or the buttons 14 may be disposed to correspond to the button sensing elements 15 in an optical sensing manner.

The inertia scroll wheel module 20 is mounted in the accommodation space 16 of the mouse body 10. The scroll wheel module 20 with a low friction includes a support frame 21, a scroll wheel 22, an antiskid outer ring member 23, a connection shaft 24, an encoding element 25, and a middle button sensing element 26.

The support frame 21 includes a first support member 211 and a second support member 212. Bottom portions of the first support member 211 and the second support member 212 are separately fixed at the lower housing 12. A placement space 213 is formed between the first support member 211 and the second support member 212.

The scroll wheel 22 is placed in the placement space 213, so that the scroll wheel 22 is located between the first support member 211 and the second support member 212. The scroll wheel 22 is a non-metallic element. The non-metallic element that forms the scroll wheel 22 may be an element made of a transparent or semi-transparent glass material. In addition, the non-metallic element that forms the scroll wheel 22 may alternatively be an element made of a ceramic material, so that weight of the scroll wheel 22 is increased, so as to improve rotational inertia. The antiskid outer ring member 23 is sleeved on an outer portion of the scroll wheel 22 and is fixed at the scroll wheel 22. The antiskid outer ring member 23 and the scroll wheel 22 are concentrically configured. The antiskid outer ring member 23 may be an element made of a transparent or semi-transparent material, but is not limited thereto.

The connection shaft 24 passes through and is connected to the scroll wheel 22, so that the scroll wheel 22 is fixed at the connection shaft 24; and therefore, the scroll wheel 22 can rotate with the connection shaft 24. The connection shaft 24 has a first connection section 241 and a second connection section 242. The second connection section 242 protrudes from one end of the first connection section 241. One end that is of the first connection section 241 and that is far away from the scroll wheel 22 is pivotally connected to the first support member 211. A crimping portion 2411 protrudes, in a direction away from the first support member 211, from one end that is of the first connection section 241 and that is far away from the scroll wheel 22. The first connection section 241 has a hollow channel 2412. The first connection section 241 and the second connection section 242 are stepped. The diameter of the first connection section 241 is greater than the diameter of the second connection section 242. Central shafts of the first connection section 241, the second connection section 242, the scroll wheel 22, and the antiskid outer ring member 23 are a same central shaft. The second connection section 242 is pivotally connected to the second support member 212 and is connected to the encoding element 25, so that the encoding element 25 is connected to the scroll wheel 22 by using the connection shaft 24.

The encoding element 25 is an encoder and is electrically connected to the circuit board 13. The middle button sensing element 25 is mounted at the circuit board 13 and is electrically connected to the circuit board 13. The middle button sensing element 26 is located below the crimping portion 2411 of the first connection section 241. The crimping portion 2411 is capable of being crimped to the middle button sensing element 26. The middle button sensing element 26 is a button sensor. The first support member 211 is located between the middle button sensing element 26 and the scroll wheel 22. The second support member 212 is located between the scroll wheel 22 and the encoding element 25.

During use, first, a finger touches the antiskid outer ring member 23, and applies a rotational force to the antiskid outer ring member 23, so that the antiskid outer ring member 23 drives the scroll wheel 22 to rotate; and therefore, the scroll wheel 22 can scroll in the placement space 213 of the support frame 21. When the finger presses down the antiskid outer ring member 22, the scroll wheel 22 is driven to move downward, so as to drive the connection shaft 24 to move downward with the scroll wheel 22, so that the crimping portion 2411 of the first connection section 241 can be crimped downward to the middle button sensing element 26. In this way, a middle button function of the mouse 100 is enabled, so that the scroll wheel 22 may be used as a middle button.

Because the rotational inertia is proportional to the weight, the weight of the scroll wheel 22 can be increased because a metal element that forms the scroll wheel 22 is an element made of a glass material or a ceramic material. In this way, the rotational inertia of the scroll wheel 22 is increased, thereby prolonging scrolling time of the scroll wheel 22.

Further, the scroll wheel 22 is characterized by transparent because the non-metallic element that forms the scroll wheel 22 is an element made of a transparent or semi-transparent glass material. Therefore, if a light emitting element is mounted within the mouse body 10, a light source of the light emitting element can pass through the scroll wheel 22 to the outside of the mouse 100, so that the mouse 100 can generate a particular optical effect.

In addition, because the antiskid outer ring member 23 is an element made of a transparent or semi-transparent material, the light source of the light emitting element mounted within the mouse body 10 can also pass through the antiskid outer ring member 23 to the outside. Therefore, the particular optical effect of the mouse 100 can be also increased. Further, due to the setting of the antiskid outer ring member 23, when the finger scrolls the scroll wheel 22, the finger can be prevented from sliding off, so as to increase convenience of use.

In addition, because the central shafts of the first connection section 241, the second connection section 242, the scroll wheel 22, and the antiskid outer ring member 23 are the same central shaft, decentering during scrolling of the scroll wheel 22 can be avoided, so as to prolong the service life of the inertia scroll wheel module 20, thereby the prolonging service life of the mouse 100.

Figure 4:
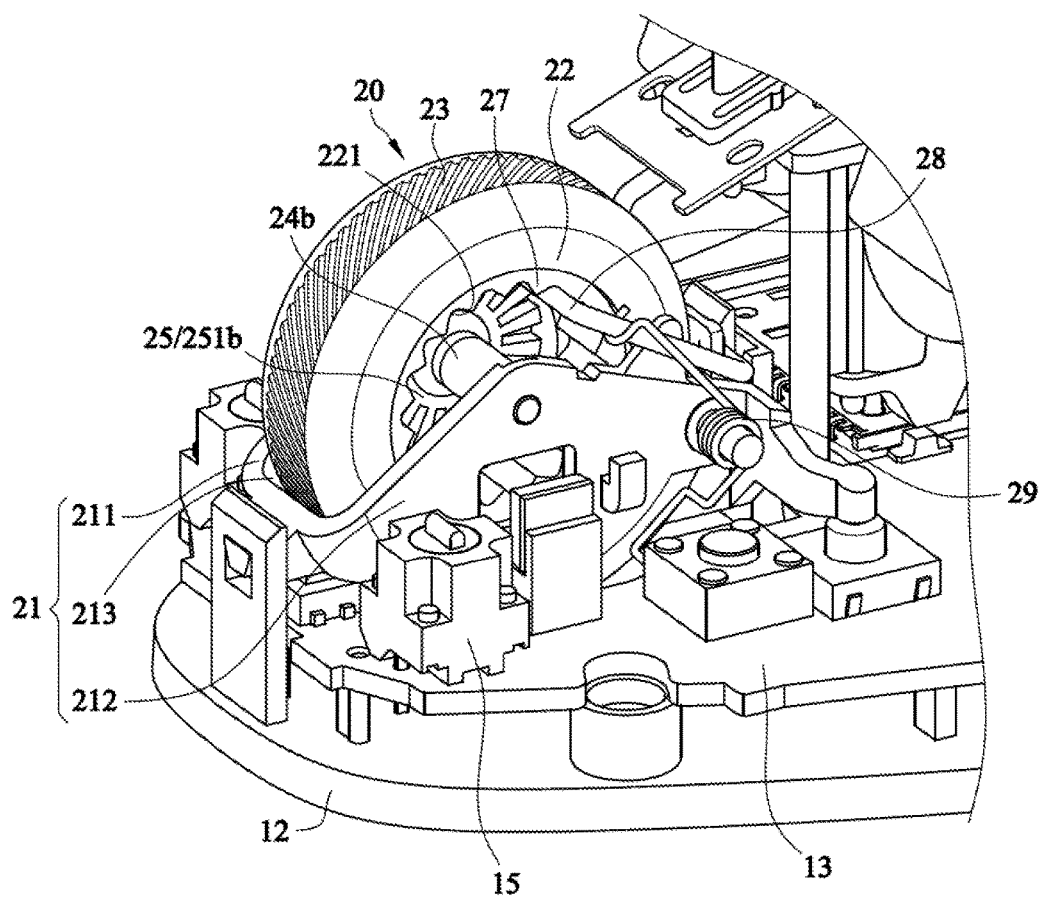
FIG. 4 is a schematic diagram of a mouse with an inertia scroll wheel module according to another embodiment of the present invention.
Figure 5:
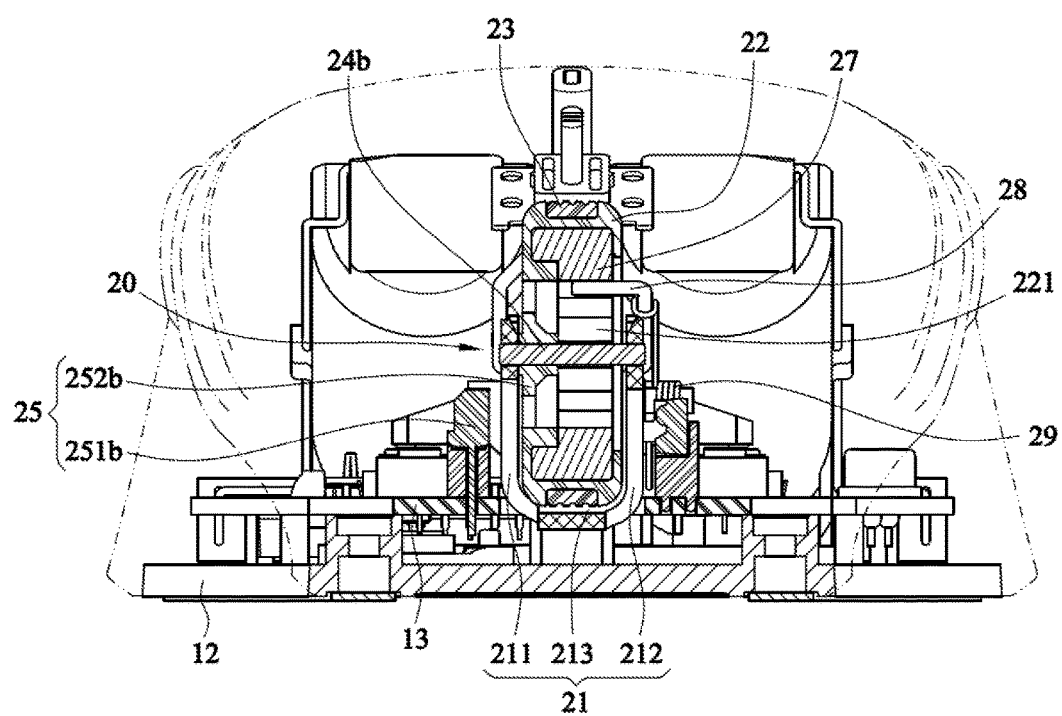
FIG. 5 is a sectional view of a mouse with an inertia scroll wheel module according to another embodiment of the present invention.

Referring to FIG. 4 and FIG. 5, FIG. 4 and FIG. 5 are a schematic diagram and a sectional view of a mouse with an inertia scroll wheel module according to another embodiment of the present invention. This embodiment differs from the foregoing embodiments in that: the connection shaft 24 is replaced with a connection shaft 24b; the encoding element 25 is a non-contact encoding element 25; the scroll wheel 22 is provided with a mounting groove 221; and the transparent inertia scroll wheel module 20 further includes an inner ratchet wheel 27, a compression bar 28, and an elastic element 29.

The encoding element 25 may be an optical encoder, and includes a rotation disk 251b and a signal receiving unit 252b. The rotation disk 251b is mounted at a side surface that is of the scroll wheel 22 and that is far away from the mounting groove 221. The signal receiving unit 252b is mounted at the circuit board 13 and is electrically connected to the circuit board 13. The signal receiving unit 252b is located at a side that is of the scroll wheel 22 and that is far away from the second support member 212, and is disposed to correspond to the rotation disk 251b, so that the signal receiving unit 252b can receive a rotational displacement signal of the rotation disk 251b.

The connection shaft 24b passes through and is connected to the rotation disk 251b and runs through the mounting groove 221 of the scroll wheel 22. The rotation disk 251b is fixed at the connection shaft 24b, so that the scroll wheel 22 is connected and fixed to the connection shaft 24b by using the rotation disk 251b. Two ends of the connection shaft 24b are respectively pivotally connected to the first support member 211 and the second support member 212. Central shafts of the rotation disk 251b, the mounting groove 221, the connection shaft 24b, the antiskid outer ring member 23, and the scroll wheel 22 are a same central shaft.

The mounting groove 221 is located at a side that is of the scroll wheel 22 and that is adjacent to the second support member 212. The inner ratchet wheel 27 is mounted in the mounting groove 221 of the scroll wheel 22. One side of the compression bar 28 is pivotally connected to the lower housing 12, and the other side is engaged with the inner ratchet wheel 27. One side of the elastic element 29 is connected to the second support member 212, and the other side is connected to compression bar 28. The inner ratchet wheel 27 is an element made of a soft material such as rubber, polyurethane, or silicon. The elastic element 29 is a spring.

When the scroll wheel 22 is scrolled, because the compression bar 28 is engaged with the inner ratchet wheel 27, continuous ratcheting can be generated during the scrolling of the scroll wheel 22. Further, because the inner ratchet wheel 27 is an element made of a soft material such as rubber, polyurethane, or silicon, noise that is generated between the inner ratchet wheel 27 and the compression bar 28 during the scrolling of the scroll wheel 22 can be eliminated, so as to reduce scrolling noise.

Further, by means of the setting of the inner ratchet wheel 27, the compression bar 28, and the elastic element 29, a hand feeling of continuous ratcheting can be provided. When accurate scrolling is needed, a user can be provided with a specific spinning feel when scrolling the scroll wheel 22.

It can be learned from foregoing descriptions that, first, the scroll wheel 22 is an element made of a glass material, so as to increase the weight of the scroll wheel 22 and increase the rotational inertia of the scroll wheel 22, thereby prolonging the scrolling time of the scroll wheel 22; second, because the scroll wheel 22 and the antiskid outer ring member 23 are elements made of a transparent or semi-transparent material, the mouse 100 can generate a particular optical effect; third, because the central shafts of the first connection section 241, the second connection section 242, the scroll wheel 22, and the antiskid outer ring member 23 are the same central shaft, decentering during scrolling of the scroll wheel can be avoided, so as to prolong the service life of the inertia scroll wheel module 20; fourth, by means of the setting of the inner ratchet wheel 27, the compression bar 28, and the elastic element 29, a continuous-ratcheting effect can be generated when the scroll wheel 22 is scrolled; and fifth, because the inner ratchet wheel 27 is an element made of a soft material such as rubber, polyurethane, or silicon, noise can be reduced when the transparent inertia scroll wheel module 20 is scrolled.

The foregoing descriptions are merely preferred embodiments of the present invention, and are not intended to limit the scope of the present invention. Therefore, any other equivalent change or modification made without departing from the spirit disclosed in the present invention shall fall within the scope of the present invention.

What is claimed is:

1. A mouse with an inertia scroll wheel module, comprising:

a mouse body; and an inertia scroll wheel module, mounted in the mouse body, and comprising:

a support frame, fixed in the mouse body;

a scroll wheel, placed in the support frame and pivotally connected to the support frame, wherein the scroll wheel is a non-metallic element; and an encoding element, located at one side of the inertia scroll wheel and connected to the scroll wheel, wherein the inertia scroll wheel module comprises a connection shaft; the support frame has a first support member and a second support member whose bottom portions are separately fixed at the mouse body; a placement space is formed between the first support member and the second support member; the scroll wheel is placed in the placement space; the connection shaft passes through and is connected to the scroll wheel; one end of the connection shaft is pivotally connected to the first support member, and the other end is pivotally connected to the second support member; and the scroll wheel is pivotally connected to the support frame by using the connection shaft, wherein the inertia scroll wheel module further has an antiskid outer ring member; the antiskid outer ring member is sleeved on an outer portion of the scroll wheel; and the antiskid outer ring member and the scroll wheel are concentrically configured, wherein the connection shaft has a first connection section and a second connection section protruding from the first connection section; the first connection section is pivotally connected to the first support member; the second connection section is pivotally connected to the second support member and is connected to the encoding element; and the encoding element is connected to the scroll wheel by using the second connection section, and wherein the inertia scroll wheel module further comprises a middle button sensing element; a crimping portion protrudes from one end that is of the first connection section and that is far away from the scroll wheel; and the crimping portion is capable of being crimped to the middle button sensing element.

2. The mouse with an inertia scroll wheel module according to claim 1, wherein the antiskid outer ring member is an element made of a transparent or semi-transparent material.

3. The mouse with an inertia scroll wheel module according to claim 1, wherein the encoding element and the middle button sensing element are separately electrically connected to the mouse body; the encoding element is an encoder; and the middle button sensing element is a button sensor.

4. The mouse with an inertia scroll wheel module according to claim 1, wherein the first connection section has a hollow channel; the first connection section and the second connection section are stepped; and the diameter of the first connection section is greater than the diameter of the second connection section.

5. The mouse with an inertia scroll wheel module according to claim 4, wherein central shafts of the first connection section, the second connection section, the scroll wheel, and the antiskid outer ring member are a same central shaft.

6. The mouse with an inertia scroll wheel module according to claim 5, wherein the first support member is located between the middle button sensing element and the scroll wheel; and the second support member is located between the scroll wheel and the encoding element.

7. The mouse with an inertia scroll wheel module according to claim 1, wherein the non-metallic element that forms the scroll wheel is an element made of a glass material.

8. The mouse with an inertia scroll wheel module according to claim 1, wherein the non-metallic element that forms the scroll wheel is an element made of a ceramic material.

* * * * *